United States Patent [19]

Duske et al.

[11] 4,357,152

[45] Nov. 2, 1982

[54] FLUID BORNE PARTICULATE SEPARATOR

[75] Inventors: Wilfried P. Duske, Milwaukee; Lowell C. Frank, Okauchee, both of Wis.

[73] Assignee: Progressive Development, Inc., Milwaukee, Wis.

[21] Appl. No.: 220,818

[22] Filed: Dec. 29, 1980

Related U.S. Application Data

[63] Continuation of Ser. No. 53,974, Jul. 2, 1979, abandoned.

[51] Int. Cl.³ .................... B01D 45/14; B01D 47/10
[52] U.S. Cl. ........................ 55/257 C; 55/338; 55/391; 55/393; 55/396; 55/400; 55/427; 55/435; 261/79 A; 261/90; 261/DIG. 9; 261/DIG. 54; 110/215; 110/216
[58] Field of Search ............ 55/222, 238, 257 C, 55/339, 340, 391, 393, 396, 400, 424, 427, 435, 338; 261/79 A, 90, DIG. 9, DIG. 54; 110/215, 216, 301, 345

[56] References Cited

U.S. PATENT DOCUMENTS

| | | | |
|---|---|---|---|
| 566,001 | 8/1896 | Marshall | 55/340 |
| 572,177 | 12/1896 | Patterson | 261/DIG. 9 |
| 1,955,465 | 4/1934 | Lissman | 55/396 |
| 2,289,474 | 7/1942 | Anderson | 55/393 |
| 2,740,493 | 4/1956 | Wintermute | 55/396 |
| 2,806,550 | 9/1957 | Westlin | 55/396 |
| 2,806,551 | 9/1957 | Heinrich | 55/340 |
| 2,976,949 | 3/1961 | Murphy et al. | 55/238 |
| 3,426,509 | 2/1969 | Wilhelmsson | 55/435 |
| 3,755,990 | 9/1973 | Hardison | 55/222 |
| 3,861,891 | 1/1975 | Noguchi et al. | 261/90 |
| 3,884,656 | 5/1975 | Deane | 55/340 |

FOREIGN PATENT DOCUMENTS

| | | | |
|---|---|---|---|
| 2116997 | 10/1972 | Fed. Rep. of Germany | 55/238 |
| 297446 | 2/1929 | United Kingdom | 55/238 |
| 458792 | 12/1936 | United Kingdom | 55/340 |
| 779589 | 7/1957 | United Kingdom | 55/427 |
| 467195 | 7/1975 | U.S.S.R. | 55/400 |

Primary Examiner—David L. Lacey
Attorney, Agent, or Firm—Andrus, Sceales, Starke & Sawall

[57] ABSTRACT

A particulate separator of the concurrent flow type includes an inner cylinder mounted concentrically within a tapered conical outer cylinder which is closed at the outer return end. A fan unit is secured within the return end of the outer cylinder to draw air inwardly through the center cylinder, impart a centrifugal force thereon and imparting a tangential spin to the air moving outwardly and then rearwardly and back through the outer conical cylinder. The particulate matter within the fluid moves outwardly to the periphery of the outer cylinder as a result of centrifugal forces. The tangential spin imparted to the air cause the air to move in spiral return path with the conical cylinder establishing a decreasing cross section. The discharge end of the tapered cylinder includes a main air discharge outlet encircling the inlet cylinder for discharge of the clean air and an outer annular skimmer including an inner parting wall separating the outer layer of air adjacent the outer cylinder annular opening for separate removal of the particulate air stream adjacent to the periphery of the cylinder.

8 Claims, 5 Drawing Figures

FLUID BORNE PARTICULATE SEPARATOR

This is a continuation application of application Ser. No. 053,974, filed July 2, 1979, now abandoned.

BACKGROUND OF THE INVENTION

This invention relates to a fluid moving apparatus and particularly to a particulate separator of the concurrent flow type for removing of fluid-borne particles from the fluid.

In many applications, there is a demand for the separation of particulate from a fluid such as particles from air. Various types of separators are available and various designs have been suggested for the purpose of particulate separation. A cyclone-type separator is one rather widely used separator for various industries and applications. In cyclone-type separators the particle laden air is introduced in a tangential flow path to centrifugally force the particles to the outer periphery. The relatively clean air is drawn upwardly through the center and the separated particles drop down through the bottom of the unit under force of gravity. Such separators are generally relatively inefficient because of the minimal time permitted for the accumulation and separation of dust particles and possible partial re-entrainment in the reverse flow. Such separators are primarily useful in removal of relatively heavy particles. In dehydration of citrus pulp, cleaning of boiler exhaust gases and the like, a scroll type separator has been suggested in which a pair of concentric cylinders are vertically mounted with a bottom inlet to the inner cylinder and a fan wheel mounted to the top end of the inner cylinder and within a closed end of the outer cylinder. The fan wheel draws the particle laden air through the cylinder, forces the air laterally into the annular passage between the inner and outer cylinder where the air flows in a counter flow to the inlet end of the cylinder, with the particle concentrated in the outer peripheral layer within the outer cylinder. An annular discharge opening is provided in alignment with such peripherial layer for separate removal of the particle laden air. Although providing satisfactory particle removal, maximum particle separation has not been obtained and significant particulate remains in the main discharged air stream.

SUMMARY OF THE PRESENT INVENTION

The present invention is particularly directed to an improvement in a concurrent flow separator having means to significantly improve the efficiency of the particulate separation. Generally in accordance with the teaching of the present invention, the outer return passageway wall is specially formed of a successively reduced cross section from the starting portion of the concurrent flow passageway to the annular discharge or skimmer means. The outer passageway wall is preferably conically shaped to establish a continuous progressively reduced cross-section. A plurality of annular skimmer openings can be provided for more effective removal of the particulate matter. The annular skimmer openings may include a scroll drum for more effective directing the concentrated particle laden air into the discharge opening for the efficient and effective removal of concentrated particulate matter from the separator for appropriate disposal or further treatment. The conical shape of the concurrent flow passageway serves to concentrate and hold the particulate adjacent the periphery and thereby enhance the highly effective particle removal. The outer cone-shaped surface is preferably formed with a smooth surface such as a polished surface to prevent particle entrapment or turbulence in the air stream. A significant advantage which applicant has discovered is that the particulate separator constructed in accordance with the present invention may be employed in any physical orientation. Thus the separator can be mounted with the cylinder axis in a horizontal position as well as a vertical position. Any other desired intermediate position can also be used as required by design convenience and the like. This particularly adapts the unit for use in connection with varied applications, for example, connected to the outlet of a cyclone separator, dropout box outlets of dehydration equipment or directly in other dust controlled systems. In accordance with a preferred construction and feature of the present invention, the annular skimmer outlet and the main clean air outlet are separate assemblies and interconnected to each other and to the flow housing to permit annular orientation as required. The annular skimmer can also be made of an adjustable diameter to accommodate varying load conditions.

In certain applications, treatment of the air borne particulate may be desired or required. In another embodiment of the invention, the inlet portion of the inner cylinder includes a venturi throat section and a final flared portion with a suitable treating fluid supply member mounted at the center of venturi throat. For example, for liquid scrubbing of the particle, a nozzle may be provided at the venturi throat. The high turbulence created in the throat section results in a high atomization of the scrubbing liquid with a resulting intimate contact to the air borne particulate matter. The venturi section will also tend to increase the cross-sectional area of the concurrent flow at the discharge point thereby increasing the resident time of the particles in the air path and increasing separation efficiencies.

The concurrent flow system can be further modified to provide for limited recirculation of the air adjacent the inlet end of the assembly. For example, the inlet cylinder may be formed with appropriate openings to establish internal recirculation of a portion of the fluid which would otherwise discharge as a part of the relatively clean air.

The present invention provides an improved air moving device for simultaneously functioning as a particulate treating and separator.

DESCRIPTION OF THE DRAWING FIGURES

The drawings furnished herewith illustrate a preferred construction of the present invention in which the above advantages and features are clearly disclosed as well as others which will be readily understood from the following description.

DESCRIPTION OF THE ILLUSTRATED EMBODIMENTS

Figure 1:
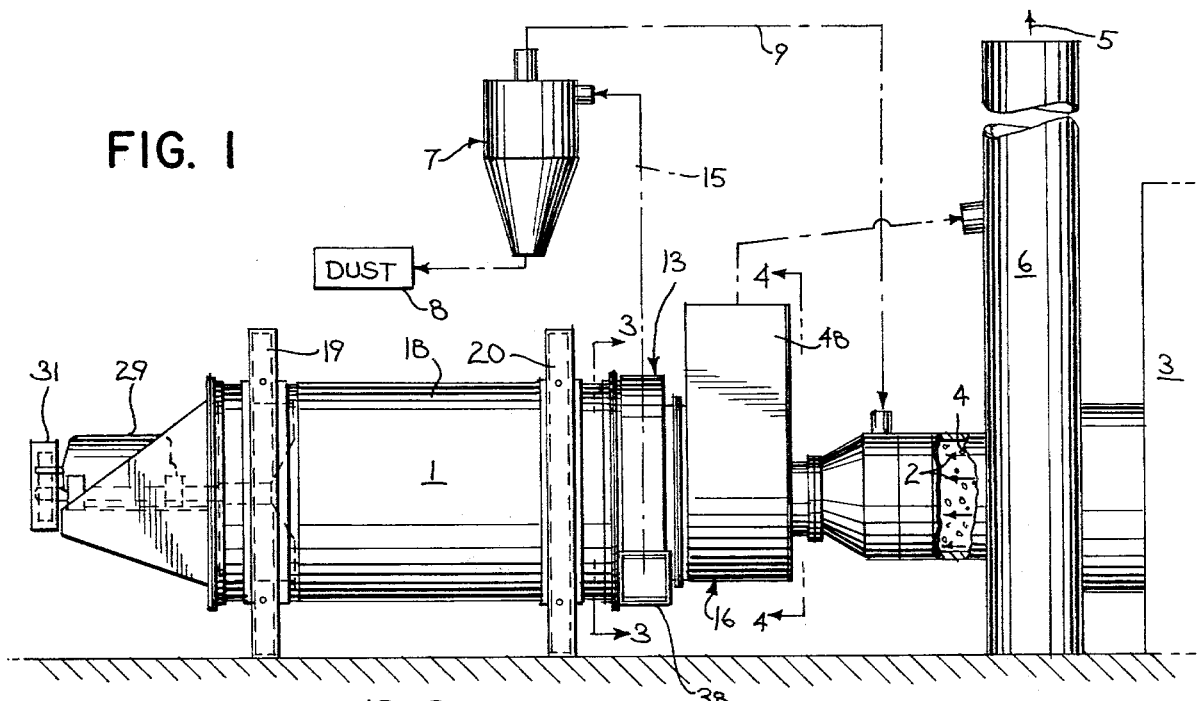
FIG. 1 is a side elevational view of a separator constructed in accordance with the teaching of the present invention and applied to a boiler exhaust system.

Referring to the drawings and particularly to FIG. 1, a novel scroll-type particulate separator 1 is shown coupled to receive the exhaust gases 2 of a boiler 3 for cleaning of such gases of particulate matter 4 and discharging the clean air 5 into a boiler stack 6 for discharge into the atmosphere. Thus, the exhaust gases 2 include particulate matter 4 which is separated from the main gas stream by the scroll-type separator 1 and passed to and through a suitable dust collector 7 for final separation of the particulate from the exhaust air. The particulate is then removed to an appropriate disposal site by any suitable means 8 while the clean carrier air is returned and mixed with the exhaust gases from the boiler, as shown by line 9.

Generally, the novel separator 1 includes an inner inlet cylinder 10 connected to the output of the boiler 3 and concentrically mounted within an outer cylinder 11. A fan wheel unit 12 is mounted within the outer end of cylinder 11 adjacent the end of cylinder 10. The exhaust gases 2 are drawn into the separator 1 and pass through the central passageway and then are turned 180 degrees to establish a counterflow through the return passageway immediately adjacent to the inlet duct. A skimmer unit 13 is secured to cylinder 11 and receives the relatively concentrated particle laden gases 14 from the wall of cylinder 11. Unit 13 is connected by line 15 to the dust collector 7 for further separation and removal of the dust and return of the air to the inlet duct 10 via line 9. A clean air discharge unit 16 is secured between unit 13 and inlet duct 10 to receive the relatively clean gases 17 and discharge them to stack 6.

The boiler, stack and dust collector may be of any suitable or known construction. Various well known devices are available and no further description thereof is given other than as necessary to clearly understand the operation and structure of the illustrated embodiment of the present invention.

Figure 2:
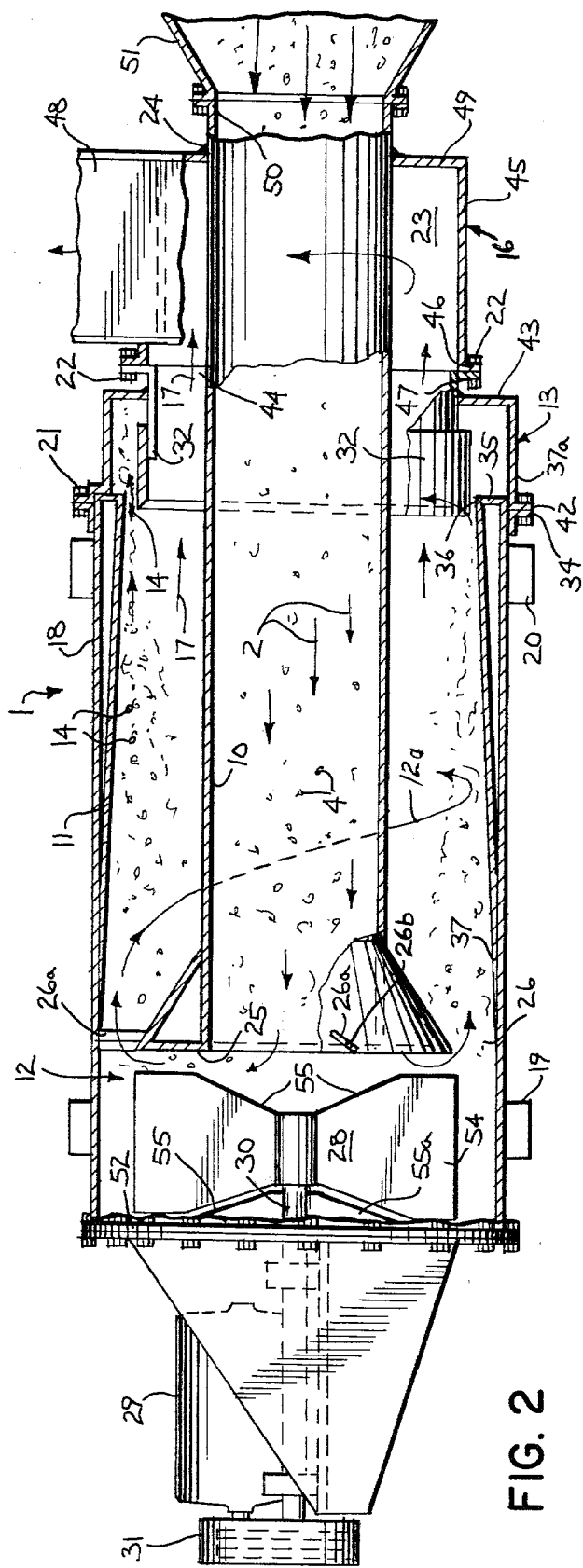
FIG. 2 is a enlarged longitudinal section of the separator shown in FIG. 1.

Referring to FIG. 2, separator 1 includes an outer cylindrical body 18 of a suitable sheet steel. Rectangular supporting frame structures 19 and 20 are interconnected in axially spaced relationship to the body 18 and define mounting posts for appropriate interconnection and support of the separator to a suitable ground support or the like. The inlet end of body 18 is flanged and the skimmer unit 13 includes a corresponding mounting flange which is bolted thereto as by equicircumferentially distributed bolt units 21. The main air discharge unit 16 is similarly interconnected by equicircumferentially spaced bolt units 22 to the skimmer unit 13 and closes the end of the body 18. The discharge unit 16 includes an annular discharge chamber 23 with inlet tube 10 secured as by weld 24 to the center of chamber 23. The inlet tube 10 is a steel member which extends inwardly through the body 18 with the innermost end located inwardly of the opposite or outer end of the body 18 to define the fan chamber in the outer end of body 18. A dividing wall 25 is welded or otherwise secured to the end of tube 10 and extends radially outwardly, with the edge of wall 25 spaced from body 18 and return cylinder 11 to couple the fan chamber to the return passageway as at 26. The end of inlet cylinder 10 at the wall 25 may be supported by one or more support elements 26a connected to cylinder 11. The elements 26a are of such a profile and orientation as to result in minimum turbulence while providing sufficient support to the cylinder 10. Suitable support elements 26a oriented generally in the direction of flow are shown in FIG. 2. Similar vane-type elements 26a may be provided for directing of the air to provide optimum tangential or spin direction to the air. Such vane-type elements may be fixed, or adjustably mounted as by a shaft 26b to permit positioning in accordance to a particular air flow pattern.

The vane-type elements may also act as cut-off edges to remove the air from the opposing fan-blade edge.

The fan unit 12 includes a fan wheel 28 rotatably mounted in the outer end of the body assembly immediately adjacent to the end wall 25 of inlet tube 10. A drive motor 29 is mounted externally to the outer end of the body assembly and is coupled to drive the fan wheel 28. The motor 29 may be an appropriate electric motor coupled to the fan wheel shaft 30, which is shown as a suitable pulley drive unit 31. The fan wheel operates typically with a peripheral tip speed on the order of 10,000 to 20,000 feet per minute and imparts a similar tangential velocity to the dust particles. This, coupled with the further increase in tangential velocity due to the tapered outer cylinder 11, gives a significantly higher centrifugal force acting on the dust particles. The fan wheel operates not only to draw the particle laden air inwardly through the inlet tube 10 but redirects such air laterally within the fan chamber and establishes the countercurrent flow within the fan chamber and establishes the countercurrent flow within the passageway between the inlet tube 10 and the outer wall. The fan creates the necessary tangential velocity required concentration of the particulate in the outer air layer 14. In accordance with the present invention, the outer wall 11 is conically shaped to establish a continuously decreasing diameter extending substantially from the opening 26 at the fan wheel chamber to the skimmer unit 13.

In operation, the particle laden air 2 is drawn inwardly through the inlet tube 10 at relatively high velocity. The fan wheel 28 imparts a radial motion to the particle laden air and imparts a substantial tangential spin to the air and particles. The air thus moves outwardly and is then redirected as a concurrent air flow through the outer passageway as a counterflow. As a result of the spinning motion applied to the air, the flow continues through countercurrent flow passageway as spiral flow with the continuing centrifugal force on particles concentrating the particles adjacent the outer conically shaped return wall 11. The particle laden air is concentrated more and more adjacent such wall 11 as a result of the reduced cross section and as a result of the increased circumferential velocity due to conservation of angular momentam. This results in a relatively narrow or thin outer layer 14 at the time such air reaches the skimmer unit 13.

As shown in FIG. 2, the skimmer unit 13 is a scroll-type unit including a central discharge tube 32 in outwardly spaced relation to the inlet tube 10 and defining a common wall to the main air outlet unit 16. The concentric common wall 32 divides the concurrent flowing air and the thin outer layer into skimmer unit 13, while the relatively clean air 17 located inwardly of tube 32 continues to move through the inner passageway to the main discharge outlet unit 16. The leading edge of dividing wall 32 is shaped such that minimum turbulence results during the separation of the air stream. The dividing wall 32 may be further constructed or mounted to permit adjustment of the effective spacing from wall 11 to vary the thickness of layer 14 diverted into unit 13. The wall 32 is shown as a two part member, having the outer severing portion slidably mounted on a fixed supporting portion. Suitable positive wall connecting means may be provided.

The outer conical housing unit 11 has been found to significantly improve the functioning of the separator and particularly adapts the separator to the effective particle separation while permitting the use of the device in a horizontal or any other orientation.

Figure 3:
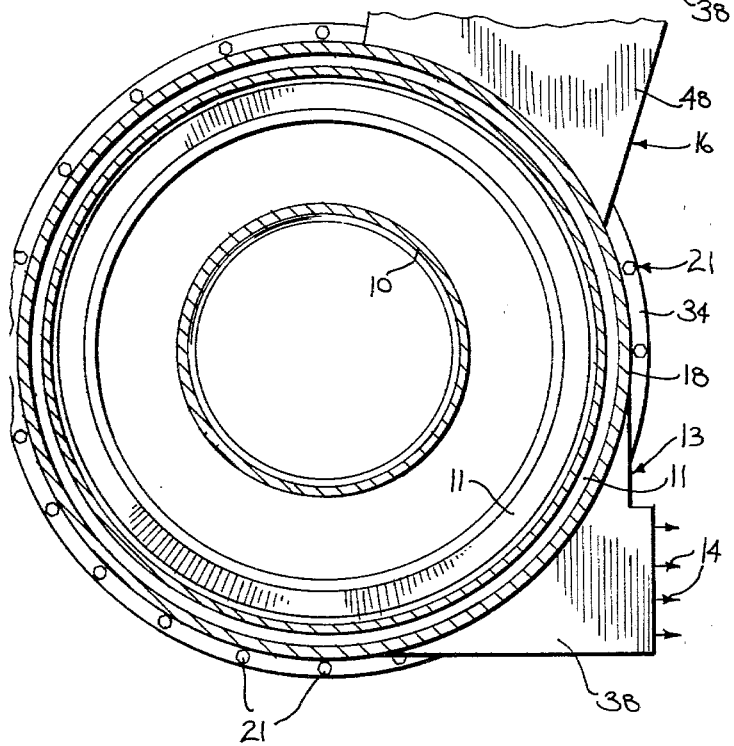
FIG. 3 is a transverse section taken generally on line 3—3 of FIG. 1.
Figure 4:
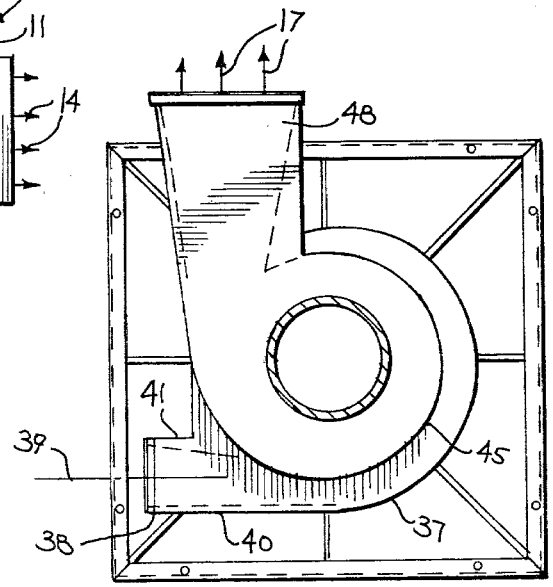
FIG. 4 is a transverse section taken generally on line 4—4 of FIG. 1.

More particularly, as shown in FIGS. 2-4, the outer body 18 is a cylindrical member terminating in the opposite end in an appropriate circular flange 34. The housing includes an inner flange 35 adjacent the skimmer unit 13. The conical wall 11 is secured to the inner edge of flange 35 as at 36, to form a smooth fluid tight connection. The wall 11 extends axially therefrom with the opposite end feathered as at 37 and welded to the housing 18 to form a smooth inner wall 11. The wall 11 is also formed with a smooth inner surface, and may advantageously be polished to minimize turbulence and reentrainment of dust particles into the air stream as the outer layer 14 moves axially into skimmer unit 13.

The illustrated skimmer unit 13 includes a scroll-shaped outer wall 37a spaced on a common axis with the dividing common wall 32. As shown most clearly in FIG. 4, a tangential discharge or outlet duct 38 of the skimmer 13 has a center line 39 extending tangentially of the discharge flow path from the annular skimmer discharge passageway. The duct 38 includes an outer sidewall 40 tangential of the scroll-shaped wall 37a and an inner flared wall to define an increasing discharge cross section. The sidewall of unit 13 projects over the housing, as shown in FIG. 4, and includes a flange 42 abutting the flange 34 of housing 18. The flanges 34 and 42 are bolted to each other, as at 21. An end plate 43 extends inwardly and is welded to the dividing wall 32 to form the skimmer unit 13 as a subassembly, which is bolted in position to form a fluid-type connection to the discharge end of the conical wall 11 with an annular discharge opening 44 aligned with the outer particle laden air layer 14.

The main discharge unit 16 is similarly formed with an outer scroll-shaped wall 45 having a mounting flange 46 bolted in fixed relation to the outer mounting flange 47 of the common divider wall 32. The wall 45 forms a continuation of the inner main flow passageway between the common wall 32 and the inner inlet tube 10.

A discharge duct 48 is secured to the side wall 45 with a tangential discharge path in the same general manner as the skimmer discharge duct 38. The outer face plate 49 of the discharge outlet is sealed to the inlet tube 10 which projects outwardly slightly therefrom with a suitable mounting flange 50 for interconnecting of tube 10 to the discharge duct 51 of the boiler 3.

The outer end of the body 18 is sealed by a suitable end wall 52 to define the fan chamber within which the fan wheel unit 12 is located. The fan shaft 30 is rotatably supported within the end wall and projects outwardly with the outer end coupled to the electric drive motor 29. The fan wheel unit 12 is shown as a multiple bladed unit with each blade 54 having slanted edges 55 which extends outwardly therefrom with an increasing blade depth to a generally rectangular portion generally aligned with the inlet tube end wall 25. The end wall 52 is provided with a conical plate 55a to follow the slanted edge of fan wheel 12. The outer blade edge aligned substantially with the outer edge of the counterflow opening 26. Rotation of the fan wheel unit results in the drawing of the particle laden air into through the inlet chamber. As it moves into the fan, the fan blades impart a centrifugal tangential force to the air causing it to move outwardly through the fan chamber to the opening through the fan chamber to the opening 26 and in the return flow path. The moving efficiency may be improved by forming a plurality of angularly oriented bar-like members on the interior surface of the fan housing wall. Such member cooperates with the peripheral edges of the fan blades and function as cutoff edges to remove and properly direct the air into the return passageway opening 26. Some or all of peripherial air may also be removed at this point by an appropriate means in the wall.

The conical wall 11 develops the concentrated particle laden air layer 14 as the air moves in a tangential manner to the skimmer opening at the dividing wall 32. The dividing wall 32 in essence severs the air stream diverting the particle laden air layer 14 into the skimmer discharge assembly while permitting the free flow of the relatively clean air through the passageway into the main outlet discharge unit. For example in a boiler application, the air may be discharged at the rate of 32,000 ACFM at a temperature of 525 degrees Fahrenheit. It is drawn into the separator by the fan wheel with approximately 4,000 ACFM supplied at the inlet end and recirculated from the dust collector. Thus, approximately 36,000 ACFM flow flows through the separator, the 4,000 ACFM is separated by the skimmer and recirculated while the 32,000 ACFM clean exhaust is exhausted through the boiler stack.

The separator 1 as previously noted is particularly adapted to operation in any desired orientation and is therefore particularly adapted for use in a low profile dehydration system having a relatively horizontal profile for example as disclosed in the copending application of the present inventors entitled "Dehydration Equipment" filed on July 2, 1979 with Ser. No. 06/53,973 now abandoned.

The equicircumferentially spaced connecting bolts permit the angular orientation of the main outlet unit 16 and the skimmer outlet unit 3 in anyone of the multiple positions while maintaining effective movement of the air. Thus, in a practical construction the bolt openings were formed with a 15 degree spacing to permit corresponding angular orientation of each unit 13 and 16.

Figure 5:
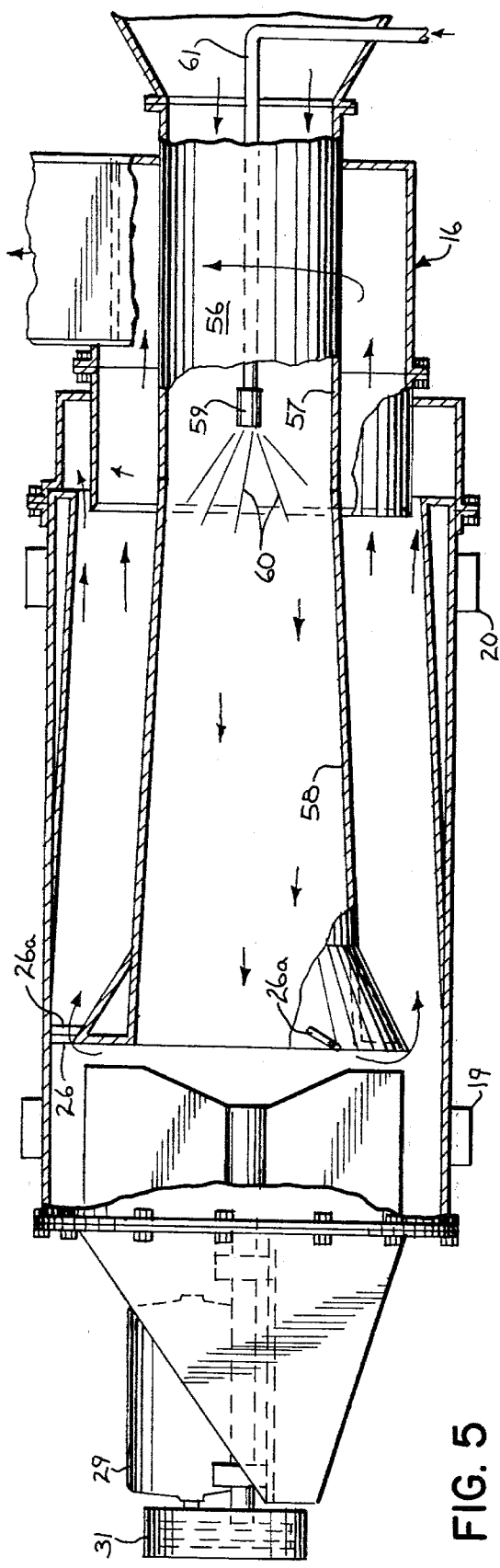
FIG. 5 is a view similar to FIG. 2 showing an alternate embodiment of the invention.

Although the illustrative embodiment of FIGS. 1-4 satisfactory and effective separation of particles, certain installations may require modification of the particle laden air such as water scrubbing of the particles. A modification to the above embodiment to provide such function is shown in FIG. 5, and the changes are described below.

An inlet tube or duct 56 is formed as a venturi section. Thus the inlet tube 56 includes a generally constant diameter throat section 57 immediately adjacent to the air inlet connection. The constant diameter section extends for approximately ⅓ of the total distance of the inlet tube and then begins to gradually increase in diameter, as flared member 58, to the outermost end adjacent to the fan wheel chamber. The movement of the air through the throat section will result in an acceleration of the air therethrough. When the air moves from the throat section 57 to the flared section 58, the air expands in accordance with the expanding chamber by the increasing inlet tube cross section. A water nozzle unit 59 is shown concentrically mounted within the throat section 57 and in slightly spaced relation to the discharge end of the throat section. The nozzle unit 59 may be of any conventional atomizing type adapted to discharge a water spray 60 into an air flow as a relatively broken or fine mist. The nozzle unit 59 is of course coupled through a suitable conduit 61 to a suitable source of water. The water moves into the rapidly moving stream immediately adjacent to the discharge end of the throat section. The relatively high turbulence associated with the venturi action will result in further atomization of the water and mixing with the air flow to facilitate and enhance the scrubbing and moistening of the dust particles carried by the air stream.

The water introduced into the unit may be mixed with a suitable emulcifier to establish relatively uniform product at the discharge end of the unit. When employed with the water spraying modifier or the like, the several components in the flow passageway should of course be formed of a suitable corrosion resistant material or otherwise suitably treated to prevent adverse corrosion and the like.

Although not illustrated, the various components or elements can of course be formed with replaceable wearplates where required. Further the internal passageway may be provided with special deflecting plates and the like for improving or assisting in the motion of the particle laden air through the separator.

A suitable cooling means might also be applied if the relatively high temperature fluids are being treated. Conversely, a high temperature carrier fluid might be desired to dry incoming particles as the fluid passes through the separator.

The structure of FIG. 5 may otherwise be constructed as the previous embodiment with the modification of the inlet tube as described above.

Although not illustrated, the inlet duct 10 may be provided with suitable opening means to allow recirculation of a portion of the air or other gases and particles which may remain in the relatively clean air directed to the discharge unit 16 where the exceptional clean exhaust requirements are established, or conditions are such that a single pass cannot effectively clean the exhaust fluid. Suitable means may also be associated with the inlet duct means to establish a spiral flow within the inlet duct. The concurrent flow system with a reverse or counterflow passageway construction may be modified to a straight concurrent flow through in accordance with the broadest aspect of the invention by directly introducing the particulate laden fluid from the opposite end of a rotary fluid moving means which imparts the high tangential velocity to the fluid medium at the large entrance end of the outer confining housing. A plurality of separators may of course be connected in series, with a first main discharge connected as the inlet to a downstream separator, to increase the particle removal. Further, where the volume is such that a single separator cannot handle the air flow, a plurality of separators can of course be connected in parallel. These and similar modifications can be readily provided by those skilled in the art, consequently no further description is given thereof.

Various modes in carrying out the invention are contemplated as being within the scope of the following claims, particularly pointing out and distinctly claiming the subject matter which is regarded as the invention.

We claim:

1. A particulate separator for removing fluid borne particulate from a fluid carrier medium, comprising an outer confining housing, an inlet tube means mounted within the housing and adapted to receive the particulate laden fluid carrier medium and having an inner discharge end, said inlet tube means extending into said confining housing and being spaced from the confining housing to define an annular return passageway therebetween having a return inlet adjacent the discharge end and adjacent the outer confining housing, means for establishing flow of said particulate laden fluid carrier medium through said inlet tube means and including means located adjacent the discharge end of the inlet tube means and between the discharge end and the outer housing and constructed and arranged for redirecting the flow of said particulate laden fluid medium about the inner end of the tube means and into said return inlet of said return passageway and imparting a high centrifugal spin to the particulate laden fluid carrier medium as the fluid carrier medium flows from the inlet tube means and into and through the return passageway whereby centrifugal forces act on the particulate to concentrate the particulate within the radially outer portion of the air stream in said return passageway and adjacent said outer confining housing and extended in a reverse direction to the exterior of said inlet tube means, said outer confining housing converging from the return inlet to an outlet means substantially axially spaced from said return inlet whereby said return passageway is substantially elongated to establish a significant resident time of the particulate laden fluid carrier medium in the return passageway, said inlet tube means comprises a continuous inner wall from the return inlet to said outlet means whereby the fluid medium moves with a substantially spiral motion along the confining housing with an increased velocity, said return passageway being essentially a clear unobstructed axial passageway from said return inlet to said outlet means permitting the free spiral flow therethrough with essentially undisturbed separation of flow materials within said return passageway and with essentially the only radial force acting on said particulate being said centrifugal forces created by said centrifugal flow, said outlet means includes a separation wall means located between said inlet tube means and said housing so as to provide parallel inlet and outlet passageways from said clear unobstructed return passageway for separating an inner radial portion of the fluid from an outer radial portion of the fluid, said wall means being arranged and constructed whereby said outer radial portion is substantially radially narrower than said inner radial portion, first discharge means coupled between the separation wall means and said housing for discharging the radially outer portion of the fluid stream, and second discharge means located between the separation wall means and the inlet tube means for discharging the radially inner portion of the fluid stream.

2. The separator of claim 1 wherein said outer confining housing includes an inner polished surface presented to said fluid medium to prevent particle entrapment and re-entrainment.

3. The separator of claim 1 wherein said separation wall means includes an adjustable mounting for adjusting the relative radial thickness of the outer radial portion and the inner radial portion to the opposite sides of said separation wall means.

4. The separator of claim 3 wherein said separation wall means includes a common wall axially movable relative to said outer confining housing and common to said inlet and outlet passageways.

5. The separator of claim 1 further including vane means between the inlet tube means and the outer confining housing means, said vane means being constructed and located to properly direct fluid medium into the outer confining housing.

6. A tangential scroll separator of the concurrent flow type, comprising an outer support housing, an inner tube means mounted within and terminating in an inner end within the housing and having a short inlet section and a relatively long flared section forming a venturi passageway through said inlet tube means, and outer tube means secured concentrically of said inner tube means and tapered in accordance with the flared section to define a return passageway therebetween, a partial wall means secured to the inner end of said inlet tube means and projecting toward the outer tube means and terminating in slightly spaced relation to the outer tube means to define an outer peripherial return opening into said return passageway, said partial wall means having a generally tapered portion extending toward the inner tube means to prevent creating of a pocket adjacent the outer peripherial return opening, a power driven fan wheel mounted adjacent said partial wall means and operable to draw particulate laden air through said inlet tube means and redirect said air through said peripherial opening and outwardly through the return passageway in a spiral flow pattern, said fan wheel imparting a high centrifugal spin to the particulate laden air as the air flows from the inlet tube means and into and through the return opening into said return passageway whereby centrifugal forces act on the particulate matter to concentrate the particulate matter within the radially outer portion of the air stream in said return passageway and adjacent said outer confining housing and extended in a reverse direction to the exterior of said inlet tube means, said outer confining housing converging from the return opening to an outlet means substantially axially spaced from said discharge end of the inlet tube means and said return opening whereby said return passageway is substantially elongated to establish a significant resident time of the particulate laden air in the return passageway, said inner tube means comprising a continuous inner wall from the return opening to said outlet means whereby the air moves with a substantially spiral motion along the confining housing with an increased velocity, said return passageway being essentially a clear unobstructed axial passageway from said return opening to said outlet means permitting the free spiral flow therethrough with essentially undisturbed separation of flow materials within said return passageway and with the only radial force acting on said particulate being said centrifugal forces associated with said centrifugal flow, a separation wall means located between the inner and outer tube means and projecting into the outer tube means to divide the air stream in said return passageway, a first skimmer outlet means secured to the outer tube means and said separation wall means to discharge the outer portion of the air and an end discharge means secured to the inner tube means and the separation wall means to discharge the inner portion of the air.

7. The separator of claim 6 including means to introduce a liquid medium into said short inlet section of said inner tube means to moisten the particulates in said air.

8. A particulate separator for removing fluid borne particulate from a fluid carrier medium, comprising an outer confining housing, an inlet tube means mounted within the housing and having an inner discharge end and defining a separation passageway means therebetween, said separation passageway means having an inlet end means adjacent the discharge end of the inlet tube means and an outlet end means of a substantially smaller area than said inlet end means, rotary fluid moving means mounted adjacent to the inlet end means and constructed and arranged with respect to said outer confining housing and said inlet tube means so as to impart a high centrifugal spin to the particulate laden fluid carrier medium as the fluid carrier medium flows from the inlet end means and into and through the separation passageway means whereby centrifugal forces act on the particulate matter to concentrate the particulate within the radially outer portion of the stream in said separation passageway means and adjacent said outer confining housing and extended in a direction to the outlet end means, said outer confining housing having a smooth inner surface and smoothly converging from the inlet end means to said outlet end means so as to minimize turbulence and re-entrainment of particulate, said separation passageway means being essentially a clear unobstructed axial passageway from said inlet end means to said outlet end means and permitting the free spiral flow of said fluid carrier medium therethrough with essentially undisturbed separation of particulate within said separation passageway means and with the only radial force acting on said particulate being centrifugal forces created by said centrifugal flow, said outlet end means including a separation wall means spaced radially inwardly of said confining housing and projecting into said separation passageway means and separating an inner radial portion of the fluid carrier medium, from the outer radial portion of the fluid carrier medium, said outer radial portion being substantially radially narrower than said inner radial portion, first discharge means for discharging of the radially outer portion of the fluid carrying medium, and second discharge means for discharging of the radially inner portion of the fluid carrier medium.

* * * * *

UNITED STATES PATENT AND TRADEMARK OFFICE
CERTIFICATE OF CORRECTION

PATENT NO. : 4,357,152
DATED      : November 2, 1982
INVENTOR(S) : WILFRIED P. DUSKE & LOWELL C. FRANK It is certified that error appears in the above-identified patent and that said Letters Patent is hereby corrected as shown below:

Column 10, line 47,   After "medium" cancel the comma (,)
CLAIM 8

Column 10, line 51,   Cancel "carrying" and substitute
CLAIM 8               therefor ---carrier---

Signed and Sealed this

Sixth Day of March 1984

[SEAL]

Attest:

GERALD J. MOSSINGHOFF

Attesting Officer        Commissioner of Patents and Trademarks